United States Patent
Sato et al.

(10) Patent No.: US 12,258,482 B2
(45) Date of Patent: Mar. 25, 2025

(54) METHOD FOR STORING AQUEOUS WHITE INK COMPOSITION FOR INKJET

(71) Applicant: SAKATA INX CORPORATION, Osaka (JP)

(72) Inventors: Yoichi Sato, Osaka (JP); Hirohito Maeda, Osaka (JP); Kazuki Moriyasu, Osaka (JP); Eri Ueda, Osaka (JP); Takaaki Sano, Osaka (JP)

(73) Assignee: SAKATA INX CORPORATION, Osaka (JP)

(*) Notice: Subject to any disclaimer, the term of this patent is extended or adjusted under 35 U.S.C. 154(b) by 73 days.

(21) Appl. No.: 17/997,779

(22) PCT Filed: Apr. 30, 2021

(86) PCT No.: PCT/JP2021/017144
§ 371 (c)(1),
(2) Date: Nov. 2, 2022

(87) PCT Pub. No.: WO2021/230099
PCT Pub. Date: Nov. 18, 2021

(65) Prior Publication Data
US 2023/0193060 A1    Jun. 22, 2023

(30) Foreign Application Priority Data
May 12, 2020   (JP) .................... 2020-084157

(51) Int. Cl.
*C09D 11/322* (2014.01)
*C09D 11/38* (2014.01)

(52) U.S. Cl.
CPC ............ *C09D 11/322* (2013.01); *C09D 11/38* (2013.01)

(58) Field of Classification Search
None
See application file for complete search history.

(56) References Cited

U.S. PATENT DOCUMENTS

| | | |
|---|---|---|
| 5,847,026 A | 12/1998 | Kitahara et al. |
| 2007/0197684 A1 | 8/2007 | Yamashita et al. |
| 2016/0060472 A1 | 3/2016 | Takahashi et al. |
| 2018/0037766 A1 | 2/2018 | Hirose et al. |
| 2020/0048486 A1* | 2/2020 | Nio .................. C09D 11/38 |

FOREIGN PATENT DOCUMENTS

| | | | | |
|---|---|---|---|---|
| EP | 2990448 A1 | | 3/2016 | |
| EP | 3263656 A1 | | 1/2018 | |
| JO | H0820739 A | * | 1/1996 | |
| JP | H0820739 A | * | 1/1996 | |
| JP | 3035147 B2 | * | 4/2000 | ............ C09D 11/03 |
| JP | 2005200467 A | | 7/2005 | |
| JP | 2007223112 A | | 9/2007 | |
| JP | 2010026468 A | | 2/2010 | |
| JP | 2017193695 A | | 10/2017 | |
| JP | 2018141067 A | | 9/2018 | |
| JP | 2020055943 A | | 4/2020 | |
| WO | WO-2014051083 A1 | * | 4/2014 | ........... C09D 11/037 |

OTHER PUBLICATIONS

Hirose, MachineTranslationofWO-2014051083-A1, 2014 (Year: 2014).*
Furusawa M, MachineTranslationofJP-3035147-B2, 2000 (Year: 2000).*
Higashiyama, Machine TranslationofJP-H0820739-A, 1996 (Year: 1996).*
International Preliminary Report on Patentability, dated Nov. 15, 2022, for corresponding international application PCT/JP2021/017144 (1 page).
Notification Concerning Transmittal of International Preliminary Report on Patentability, mailed Nov. 24, 2022, for corresponding international application PCT/JP2021/017144 (1 page).
Notification of Transmittal of Translation of the International Preliminary Report on Patentability, mailed Nov. 24, 2022, for corresponding international application PCT/JP2021/017144 (1 page).
Written Opinion of the International Searching Authority, mailed Jul. 6, 2021, for corresponding international application PCT/JP2021/017144 (3 pages).
International Search Report (ISR) mailed Jul. 6, 2021 issued for International application No. PCT/JP2021/017144. (2 pages).
Extended European Search Report (EESR) dated May 13, 2024, issued for European counterpart patent application No. EP21803549.1 (6 pages).

* cited by examiner

*Primary Examiner* — Scott A Richmond
(74) *Attorney, Agent, or Firm* — Law Office of Katsuhiro Arai

(57) ABSTRACT

An object is to provide a method for storing or transporting an aqueous white ink composition for inkjet that does not cause precipitation of a pigment therein during storage for a long period or transport, and allows the pigment to be easily redispersed even if precipitation occurs. As means for solving the problems, a storing method is provided that includes placing an aqueous white ink composition for inkjet containing titanium oxide and a pigment dispersant in a tank and maintaining the entire aqueous white ink composition for inkjet in the tank at a temperature of −5 to −35° C.

3 Claims, No Drawings

METHOD FOR STORING AQUEOUS WHITE INK COMPOSITION FOR INKJET

CROSS-REFERENCE TO RELATED APPLICATIONS

This application is the U.S. National Phase under 35 U.S.C. § 371 of International Application PCT/JP2021/017144, filed Apr. 30, 2021, which claims priority to Japanese Patent Application No. JP2020-084157, filed May 12, 2020. The International Application was published under PCT Article 21(2) in a language other than English.

TECHNICAL FIELD

The present invention relates to a method for storing an aqueous white ink composition for inkjet.

BACKGROUND ART

Among aqueous white ink compositions for inkjet, pigment-based compositions are known, and various additives are added, or a resin composition and the like have been studied so that the pigment does not, for example, settle or precipitate.

Inkjet printing devices house cartridges each filled with ink such as white, black, cyan, magenta, or red ink. The capacity of each cartridge in this case is approximately 20 mL at most.

For this reason, even when such a printing device is not used for a long period, the inkjet ink composition in the cartridge is shaken by, for example, minute vibrations that the inkjet printer receives or vibrations that each cartridge receives when, for example, the cartridge alone is moved.

Furthermore, in the first place, with the amount of ink filling the cartridge having a small capacity as described above, the content of the pigment itself is relatively small. Thus, even if the pigment precipitates, the pigment is easily redispersed.

When the inkjet ink composition is used in the inkjet printing devices, there are no particular problems caused by, for example, settlement of the pigment as described above. However, the inkjet ink composition is placed in a large tank or the like having a capacity of 1 L or more before being placed in the small cartridge.

The amount of the inkjet ink composition that is placed in such a large tank is large, and thus the amount of the pigment contained is also large. For this reason, if the ink contains a high-density pigment such as, in particular, titanium oxide, the pigment is inherently apt to settle and tends to be poor in redispersibility. All the more, the pigment that has once, for example, precipitated may undesirably adhere to the bottom of the tank and resist redispersion.

Additionally, if the tank is heavy, the inkjet ink composition is unlikely to be agitated by vibrations received from outside, and, in storage, redispersion thereof becomes difficult because receiving vibrations are smaller even during transport.

Given these circumstances, in the case that the ink composition is stored for a long period, the pigment in the inkjet ink composition needs to be dispersed by periodically shaking the container.

Also, in the case in which the ink is stored in a large tank, the tank is not likely to be stored in a specially air-conditioned warehouse, and even when the tank is transported by sea, no special consideration is given to the storage temperature.

Thus, in placing the ink in a cartridge of an inkjet printing device after storage or transport, if the pigment in the aqueous white ink composition for inkjet has precipitated, the ink is, for example, considerably strongly vibrated or forcefully stirred.

BACKGROUND ART LITERATURE

Patent Literature

Patent Literature 1: Japanese Patent Laid-Open No. 2010-026468

SUMMARY OF THE INVENTION

Problems to be Solved by the Invention

An object of the present invention is to provide a method for storing or transporting an aqueous white ink composition for inkjet that does not cause precipitation of a pigment therein during storage for a long period or transport, and allows the pigment to be easily redispersed even if precipitation occurs.

Means for Solving the Problems

After studying in earnest to achieve the aforementioned object, the inventors of the present invention found that the aforementioned object could be achieved by storing or transporting the aqueous white ink composition for inkjet under specific temperature conditions, and eventually completed the present invention.

To be specific, the present invention encompasses the following:

1. A storing method comprising
placing an aqueous white ink composition for inkjet including titanium oxide and a pigment dispersant in a tank, and the entire aqueous white ink composition for inkjet in the tank is maintained to have a temperature of −5 to −35° C.
2. The storing method according to 1, wherein the aqueous white ink composition for inkjet includes resin particles.
3. The storing method according to 2, wherein the resin particles include at least one selected from a polyurethane resin emulsion, an acrylic-based resin emulsion, a wax emulsion, and a polyester-based resin emulsion.
4. The storing method according to any one of 1 to 3, wherein the pigment dispersant includes a copolymer of styrene, lauryl acrylate, and acrylic acid.
5. The storing method according to any one of 1 to 4, wherein the titanium oxide includes either titanium oxide that has been subjected to, for example, surface treatment with any of silica, silica and alumina, and a silane coupling agent or titanium oxide that has not been subjected to a surface treatment.

Effects of the Invention

The method for storing the aqueous white ink composition for inkjet proposed by the present invention produces effects that, even after storing the aqueous white ink composition for inkjet in a large-capacity tank, and even when the pigment is a pigment having a relatively high density such as titanium oxide, the ink composition has good anti-settling property and redispersibility, and resists change in physical properties before and after storage or transport, which are included in the term "storage".

MODE FOR CARRYING OUT THE INVENTION

A pigment contained in the present invention may be either an inorganic pigment or an organic pigment, but a white ink composition for inkjet containing an inorganic pigment that is prone to precipitate is more likely to exhibit the effects of the present invention.

The term "storage" in the present invention refers to, for example, the state in which the aqueous white ink composition for inkjet is temporarily stored in a warehouse or the like until use or is loaded on a vehicle or a vessel for transport after manufacture. The storage period is one day or more.

(Inorganic Pigment)

The aqueous white ink composition for inkjet in the present invention contains titanium oxide.

Titanium oxide may, but does not necessarily have to, be subjected to surface treatment. The surface-treated titanium oxide preferably includes, for example, those treated with any of silica, silica and alumina, and a silane coupling agent.

Furthermore, specific examples of inorganic pigments that can be added in accordance with the desired color such as pastel colors include zinc flower, zinc oxide, lithopone, iron oxide, silicon dioxide, kaolinite, montmorillonite, talc, barium sulfate, calcium carbonate, silica, cadmium red, red iron oxide, molybdenum red, chrome vermillion, molybdate orange, chrome yellow, cadmium yellow, yellow iron oxide, titanium yellow, chromium oxide, viridian, cobalt green, titanium cobalt green, cobalt chrome green, ultramarine, ultramarine blue, Prussian blue, cobalt blue, cerulean blue, manganese violet, cobalt violet, mica, etc.

To the extent that it does not hinder the effects achieved by the present invention, the titanium oxide pigment may use any one type of these pigments alone or two or more types combined where the amount used is 0.5 to 10.0% by mass, or more preferably 2.0 to 7.0% by mass, relative to the total amount of aqueous white ink composition for inkjet. If the amount of pigment used is less than 0.5% by mass, the coloring strength tends to be insufficient, while an amount exceeding 10.0% by mass tends to cause viscosity to rise and ink fluidity to drop.

(Pigment Dispersant)

As the pigment dispersion component for dispersing the pigment, the aqueous composition for inkjet in the present invention can employ, for example, various copolymer resins such as an acrylic-based resin, a styrene-acrylic-based resin, a styrene-maleic acid-based resin, or a styrene-acrylic-maleic acid-based resin, and can use an alkali-soluble resin. In this case, 60% or more of acids are preferably neutralized by bases (including a metal-based alkali compound such as sodium hydroxide or ammonia). It should be noted that when the pigment used can be dispersed by a later-described alkali-soluble or self-emulsifying aqueous polyurethane resin, the alkali-soluble or self-emulsifying aqueous polyurethane resin may be used as a high molecular weight pigment dispersion component.

Among monomeric components for synthesizing the above-illustrated copolymer resins, for example, acrylic acid, methacrylic acid, crotonic acid, itaconic acid, maleic acid, fumaric acid, 2-carboxyethyl (meth)acrylate, 2-carboxypropyl (meth)acrylate, maleic anhydride, maleic acid monoalkyl ester, citraconic acid, citraconic anhydride, or citraconic acid monoalkyl ester may be used as a monomer including a carboxyl group.

In view of improving the adsorbability to the above-described pigments, (meth)acrylate including a long-chain alkyl group with 6 to 20 carbons, in particular, for example, 2-ethylhexyl (meth)acrylate, octyl (meth)acrylate, stearyl (meth)acrylate, lauryl (meth)acrylate, or 2-hydroxy stearyl (meth)acrylate is preferred. Furthermore, for example, styrene, α-styrene, or vinyl toluene may be used as a styrene-based monomer.

Additionally, other monomeric components may be, for example, (meth)acrylic acid such as methyl (meth)acrylate, ethyl (meth)acrylate, propyl (meth)acrylate, isopropyl (meth)acrylate, butyl (meth)acrylate, and hexyl (meth)acrylate, hydroxyethyl (meth)acrylate, acrylamide, N-methylol acrylamide, cyclohexyl (meth)acrylate, or benzyl (meth)acrylate.

Among these, in terms of pigment dispersibility, the monomeric components constituting the copolymer preferably contain (meth)acrylate including a long-chain alkyl group with 6 to 20 carbons and a monomer including an aromatic ring. The content of these combined is preferably 70% or more in the copolymer. It is especially preferred to employ a copolymer of styrene, lauryl acrylate, and acrylic acid. In the mass ratio of the monomer in the copolymer, styrene is preferably 20% or more, more preferably 30% or more, even more preferably 40% or more, and preferably 80% or less, more preferably 70% or less, and even more preferably 65% or less. Lauryl acrylate is preferably 3% or more, more preferably 5% or more, even more preferably 10% or more, and preferably 50% or less, more preferably 40% or less, and even more preferably 35% or less. Acrylic acid is preferably 10% or more, more preferably 20% or more, even more preferably 25% or more, and preferably 40% or less, more preferably 35% or less, and even more preferably 30% or less.

In view of the dispersibility and the dispersion stability of the above-described pigment, the acid value of the copolymer resin is preferably 40 to 300 mgKOH/g, more preferably 70 to 250 mgKOH/g, even more preferably 100 to 200 mgKOH/g, and most preferably 130 to 200 mgKOH/g.

It should be noted that the acid value in the present description refers to a theoretical acid value, which is the arithmetically obtained number of milligrams of potassium hydroxide theoretically required to neutralize 1 g of the copolymer resin (later-described alkali-soluble or self-emulsifying aqueous polyurethane resin) based on the composition of the monomer used for synthesizing the copolymer resin (later-described alkali-soluble or self-emulsifying aqueous polyurethane resin).

In view of dispersibility and dispersion stability of the above-described pigment and in view of imparting an appropriate viscosity, the molecular weight of the copolymer resin expressed as the weight-average molecular weight is generally preferably 3,000 to 200,000, more preferably 10,000 to 50,000, and even more preferably 13,000 to 30,000.

Furthermore, in the present description, the weight-average molecular weight may be measured by gel permeation chromatography (GPC). As an example, the chromatography may be carried out using Waters 2690 (manufactured by Waters) as a GPC device and PLgel 5μ MIXED-D (manufactured by Agilent Technologies) as a column to obtain a polystyrene conversion weight-average molecular weight.

Additionally, when the perspectives of discharge stability in high-gap printing, antifouling property, and bonding property are taken into consideration, the glass transition temperature of the copolymer resin is 40° C. to 100° C., and preferably 45° C. to 95° C. If the glass transition temperature of the copolymer resin is less than 40° C., discharge stability in high-gap printing and antifouling property tend to decrease, and if the glass transition temperature exceeds 100° C., bonding property tends to decrease.

The glass transition temperature of the alkali-soluble resin may be obtained by the following method.

The glass transition temperature refers to the theoretical glass transition temperature calculated using the following Wood equation.

$$1/Tg = W1/Tg1 + W2/Tg2 + W3/Tg3 + \ldots + Wx/Tgx \quad \text{Wood equation:}$$

(Where Tg1 to Tgx represent the glass transition temperature of a homopolymer of each monomer 1, 2, 3 . . . x constituting the alkali-soluble resin, W1 to Wx represent the polymerization fractions of each monomer 1, 2, 3 . . . x, and Tg represents the theoretical glass transition temperature. It should be noted, however, that the glass transition temperature in the Wood equation is an absolute temperature.)

The content of the copolymer resin is preferably 10 to 200 parts by mass relative to 100 parts by mass of the above-described pigment.

The copolymer resin is dissolved or dispersed in an aqueous medium constituted by the later-described water and a water-miscible organic solvent according to need in the presence of a basic compound, which is used as an aqueous resin varnish.

(Alkali-Soluble or Self-Emulsifying Aqueous Polyurethane Resin)

The aqueous white ink composition for inkjet in the present invention is a reaction product of at least one kind selected from a group consisting of, for example, hexamethylene diisocyanate and a polyester diol compound represented by the following General Formula 1, and a reaction component containing an acid group-containing diol compound. It contains an alkali-soluble or self-emulsifying aqueous polyurethane resin.

[Chemical Formula 1]

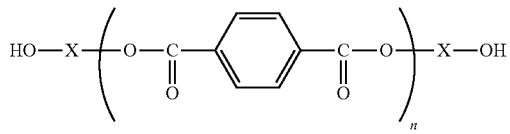

(1)

(Where X is a hydrocarbon group each independently represented by —CH$_2$—CH$_2$—CH$_2$—CH$_2$—CH$_2$—CH$_2$— or —CH$_2$—CH$_2$—CH(CH$_3$)—CH$_2$—CH$_2$—, and n is an integer 2 to 20.)

The aqueous white ink composition for inkjet in the present invention containing this alkali-soluble or self-emulsifying aqueous polyurethane resin has good storage stability and discharge stability, and also has good applicability (print quality) to a variety of base films. Furthermore, for example, when used in combination with a primer composition containing a component such as chlorinated polypropylene, such an ink composition has high laminate strength to a variety of base films.

This is probably because of the following factors. (1) The alkali-soluble or self-emulsifying aqueous polyurethane resin has good stability in dissolving or self-emulsifying in an aqueous medium. (2) It is presumed that when a coating layer of a later-described primer composition is formed, and subsequently the aqueous white ink composition for inkjet in the present invention is printed, the coating layer is dissolved by a component included in the ink composition that acts to dissolve the coating layer of the primer composition, and immixed with a printing layer of the ink composition, which forms an integrated layer. As a result, it is presumed that the adsorption sites to the base film included in both the coating layer and the printing layer (particularly, chlorinated polypropylene included in the primer composition and the adsorption sites of the molecules of the alkali-soluble or self-emulsifying aqueous polyurethane resin) are allowed to contribute to generating adhesive force to the base film. (3) Since the alkali-soluble or self-emulsifying aqueous polyurethane resin is more flexible compared with the resin used for the conventional ink composition, the printing layer of the aqueous white ink composition for inkjet in the present invention can conform to a changing shape of the base film.

The polyester diol compound represented by General Formula 1 may be obtained by condensation polymerization of, for example, hexamethylene diol, which is a diol component, and/or 3-methyl-1,5-pentylene glycol, with phthalic acid, which is a dicarboxylic acid component.

Examples of the acid group-containing diol compound include a carboxyl group-containing diol compound represented by the following General Formula 2.

[Chemical Formula 2]

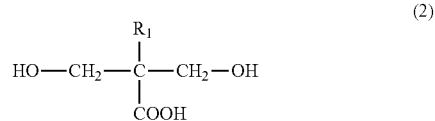

(2)

(Where R1 represents a hydrogen atom or a straight-chain or branched-chain alkyl group with 1 to 8 carbons.)

Examples of the acid group-containing diol compound include carboxyl group-containing aliphatic polyols obtained by reacting, for example, succinic acid or adipic acid with a lower polyol so that two hydroxyl groups and one or more carboxyl groups remain in each molecule, or carboxyl group-containing aromatic polyols obtained by reacting phthalic acid, trimellitic acid, pyromellitic acid, or anhydride thereof with a lower polyol so that two hydroxyl groups and one or more carboxyl groups remain in each molecule.

The alkali-soluble or self-emulsifying aqueous polyurethane resin may be a reacted product of at least one type selected from a group consisting of hexamethylene diisocyanate described above and the polyester diol compound represented by General Formula 1 with only the acid group-containing diol component. However, a chain extender or a reaction inhibitor may further be used as a reaction component according to need.

Examples of the chain extender that can be used include glycols such as ethylene glycol, propylene glycol, 1,4-butanediol, 1,6-hexanediol, and diethylene glycol, low-molecular-weight aliphatic and alicyclic diamines such as ethylenediamine, 1,4-butanediamine, 1,6-hexanediamine, aminoethylethanolamine, and isophoronediamine, and hydrazines such as hydrazine, alkyl dihydrazine, and alkyl dihydrazide.

Also, examples of the reaction inhibitor that can be used include alkylamines such as n-propylamine, n-butylamine, and N,N-di-n-butylamine, alkanolamines such as monoethanolamine and diethanolamine, hydrazines such as hydrazine, alkyl dihydrazine, and alkyl dihydrazide, and monoalcohols such as methanol and ethanol.

It should be noted that each reaction component of the alkali-soluble or self-emulsifying aqueous polyurethane resin may be used alone or in combination of two or more types. Furthermore, as the aqueous white ink composition for inkjet in the present invention, one type of polyurethane resin synthesized from the above-mentioned reaction components alone may be used. Alternatively, two or more types of polyurethane resins synthesized from different reaction components may be used in combination.

And, a general method may be used as the method for synthesizing the polyurethane resin using the above-mentioned reaction components.

For example, when the reaction components include only hexamethylene diisocyanate, the polyester diol compound represented by General Formula 1, and the acid group-containing diol compound, these three components may be reacted all together. Alternatively, after reacting hexamethylene diisocyanate and the polyester diol compound represented by General Formula 1 in a state in which isocyanate groups are excessive, the acid group-containing diol compound may be reacted.

Furthermore, when the chain extender or the reaction inhibitor is used as the reaction component, after reacting hexamethylene diisocyanate and the polyester diol compound represented by General Formula 1 in a state in which isocyanate groups are excessive to give a urethane polymer by synthesis, the urethane polymer may further be reacted with the acid group-containing diol compound and the chain extender in a state in which the isocyanate groups are excessive, followed by reacting with the reaction inhibitor. Alternatively, the acid group-containing diol compound, the chain extender, and the reaction inhibitor may be reacted all together.

The molecular weight of the alkali-soluble or self-emulsifying aqueous polyurethane resin is preferably in the range of 2,000 to 100,000, more preferably 3,000 to 50,000, and even more preferably 5,000 to 30,000 given by the weight-average molecular weight (hereinafter, unless otherwise specified, the molecular weight of the polyurethane resin refers to the weight-average molecular weight).

If the molecular weight of the alkali-soluble or self-emulsifying aqueous polyurethane resin is less than 2,000, an ink film may possibly become fragile, while a molecular weight exceeding 100,000 tends to increase the viscosity of the aqueous white ink composition for inkjet even with a small content, which may possibly hinder formation of the ink film.

The acid value of the alkali-soluble or self-emulsifying aqueous polyurethane resin is preferably 5 to 100 mgKOH/g. An acid value less than 5 mgKOH/g may possibly decrease dispersibility in the later-described aqueous medium, while an acid value greater than 100 mgKOH/g may possibly decrease drying property during printing, or water resistance, or other properties of the printed matter that is obtained.

Also, the acid value of the alkali-soluble or self-emulsifying aqueous polyurethane resin is more preferably 5 to 50 mgKOH/g in view of imparting laminate strength (peel strength between the base film and a sealant film) in a suitable manner.

It should be noted that when the acid value is decreased, the alkali-soluble aqueous polyurethane resin is changed to a self-emulsifying aqueous polyurethane resin.

In view of maintaining viscosity of the aqueous white ink composition for inkjet of the present invention low, a self-emulsifying aqueous polyurethane resin is preferred.

It should be noted that self-emulsifying aqueous polyurethane resin refers to a polyurethane resin that includes an ionic group in each molecule and has a property of being able to be dispersed in a stable manner when the ionic group is ionized in an aqueous medium.

The alkali-soluble or self-emulsifying aqueous polyurethane resin is preferably dissolved or emulsified in water in the presence of a basic compound and used as an aqueous resin varnish.

The method for dissolving or emulsifying the alkali-soluble or self-emulsifying aqueous polyurethane resin in the later-described aqueous medium includes, first, dissolving the basic compound in the later-described aqueous medium by an amount that approximately neutralizes the alkali-soluble or self-emulsifying aqueous polyurethane resin. After that, the alkali-soluble or self-emulsifying aqueous polyurethane resin is added, followed by agitating with a high-speed agitator.

In this description, the basic compound that can be used is not particularly limited, and may include any generally used basic compound. Examples include alkylamine such as butylamine and triethylamine, alkanolamine such as monoethanolamine, diethanolamine, and triethanolamine, morpholine, ammonia solution, and sodium hydroxide. The content of the basic compound may be set as appropriate in accordance with, for example, the physical properties of the polyurethane resin used, or the amount used. Any of the basic compounds may be used alone or in combination of two or more types.

The content of the alkali-soluble or self-emulsifying aqueous polyurethane resin is adjusted as appropriate in accordance with, for example, viscosity behavior in the later-described aqueous medium used, the components used in combination, and desired ink physical properties. However, the content is preferably 1.0 to 10.0% by mass relative to the total mass of the aqueous white ink composition for inkjet in the present invention. Also, in view of imparting storage stability, discharge stability, and laminate strength (peel strength between the base film and the sealant film) of the aqueous white ink composition for inkjet in the present invention, the content is more preferably 3 to 8% by mass relative to the total mass of the aqueous white ink composition for inkjet in the present invention.

The aqueous white ink composition for inkjet according to the present invention may contain resin particles. Such resin particles may be selected from various resins including, for example, polyurethane resin particles, acrylic-based resin particles, wax particles, and polyester-based resin particles.

Specifically, the resin particles may be contained in the form of various resin emulsions such as a polyester-based polyurethane resin emulsion, a polyether-based polyurethane resin emulsion, a polycarbonate-based polyurethane resin emulsion, an acrylic resin emulsion, and a wax emulsion.

The solid content concentration in the case the polyurethane resin emulsion added in the aqueous white ink composition for inkjet according to the present invention is preferably 0.1 to 10.0% by mass, and more preferably 1.0 to 5.0% by mass, to improve the effects in a well-balanced manner. A solid content concentration that is less than 0.1% by mass may possibly deteriorate laminate strength to a drawn polypropylene film or a PET film, while a solid content concentration exceeding 10.0% by mass may possibly deteriorate storage stability and discharge stability.

(Polyurethane Resin Emulsion)

The polyurethane resin emulsion needs to have a rate of elongation of 500 to 1600%, and is added in the aqueous white ink composition for inkjet in the state of an emulsion. A rate of elongation of less than 500 or exceeding 1600% deteriorates the laminate strength to, for example, a PET (polyethylene terephthalate) film.

For the rate of elongation of the polyurethane resin emulsion in the present invention, the value calculated using the formula below based on the results of measuring, under the conditions of 20 mm in tensile tester gauge length and 100 mm/min in pulling speed, a coating film of 500 μm in film thickness obtained by drying the polyurethane resin emulsion at room temperature for 15 hours as preliminary drying, and then drying it under the conditions of 80° C. for 6 hours and 120° C. for 20 minutes as main drying, can be adopted.

(Length of coating just before fracture of coating surface/length before conducting tensile test)× 100(%)

Such a polyurethane resin emulsion may be any of an aliphatic polyester-based polyurethane resin emulsion and an aromatic polyester-based polyurethane resin emulsion, a polyether-based polyurethane resin emulsion, and a polycarbonate-based polyurethane resin emulsion.

Polyester, which is used as the raw material of the polyester-based polyurethane resin, may be obtained from, for example, aliphatic acid such as adipic acid, azelaic acid, sebacic acid, and suberic acid, aromatic acid such as phthalic acid, phthalic anhydride, isophthalic acid, dimethyl isophthalic acid, terephthalic acid, and dimethyl terephthalic acid, polybasic acid such as trimellitic acid, tetrahydrophthalic anhydride, maleic acid, maleic anhydride, fumaric acid, and diols and glycols such as ethylene glycol, propylene glycol, 1,3-butylene glycol, 1,4-butylene glycol, dimethyl propanediol, 3-methyl-1,5-pentanediol, 1,6-hexanediol, octanediol, neopentyl glycol, cyclohexanedimethanol, diethylene glycol, and dipropylene glycol.

Additionally, lactone polyester polyol such as poly-γ-butyrolactone, poly-6-caprolactone, and other polyester polyols by ring-opening polymerization, obtained by using a glycol as an initiator, as well as poly(hexamethylene carbonate) diol and other polycarbonate ester diols, can also be used as a polyester.

Examples of diisocyanate compound, which is used as a raw material of the polyester-based polyurethane resin, include an aromatic diisocyanate compound such as tolylenediisocyanate and diphenylmethane diisocyanate, an aliphatic diisocyanate compound such as lysine diisocyanate and hexamethylene diisocyanate, a non-yellowing diisocyanate compound such as isophorone diisocyanate, xylylene diisocyanate, 1,3-bis(isocyanatomethyl)cyclohexane, dicyclohexylmethane diisocyanate, and tetramethylxylylene diisocyanate, and dimer acid diisocyanate.

Furthermore, to obtain the polyester-based polyurethane resin, glycols such as ethylene glycol, propylene glycol, butylene glycol, dimethyl propanediol, hexanediol, methyl pentanediol, octanediol, neopentyl glycol, cyclohexanedimethanol, diethylene glycol, and dipropylene glycol, triols such as glycerin and trimethylolpropane, or amine compounds such as ethylenediamine, propylene diamine, hexamethylene diamine, hydrazine and a hydrazine derivative compound, piperazine and a piperazine compound, diamino dicyclohexylmethane, diphenyl methanediamine, xylenediamine, or isophoronediamine may be employed as the chain extender.

The polyester-based polyurethane resin is obtained by a conventionally known method from the raw material listed above, and, for example, it is obtained by preparing a prepolymer with a terminal NCO in an organic solvent from the aforementioned polyester polyol having a molecular weight of 500 to 5,000 and containing a terminal OH group, and an isocyanate compound, and then polymerizing the obtained prepolymer using a chain extender.

The weight-average molecular weight of the polyester-based polyurethane resin is 10,000 to 200,000 or preferably 50,000 to 100,000 for aromatic polyester-based polyurethane, and 10,000 to 300,000 or preferably 50,000 to 200,000 for the aliphatic polyester-based polyurethane.

Such a polyester-based polyurethane may be SUPERFLEX 740 (anionic, average particle size 0.20 μm, minimum film-forming temperature 5° C. or less, elongation 1300%), SUPERFLEX 500M (nonionic, average particle size 0.14 μm, minimum film-forming temperature 5° C. or less, elongation 1100%), SUPERFLEX 840, or Impranil DL1380.

The polyether-based polyurethane resin may be obtained from a diisocyanate compound that is the same as the diisocyanate compound used as the raw material of the polyester-based polyurethane resin and the following polymeric diol compound.

Examples of the polymeric diol compound include polyalkylene glycols such as polyethylene glycol and polypropylene glycol, a polyether diol compound such as an alkylene oxide adduct such as ethylene oxide and propylene oxide of bisphenol A, polyester diols obtained by a condensation reaction of one type or two or more types of diacid such as adipic acid, sebacic acid, and phthalic anhydride and one type or two or more types of glycols such as ethylene glycol, propylene glycol, 1,4-butanediol, neopentyl glycol, and 3-methyl-1,5-pentanediol, and a polyester diol compound such as polycaprolactone diols. Any of these polymeric diol compounds may be used alone or in combination of two or more types.

Furthermore, in addition to the polymeric diol compound, alkane diol such as 1,4-pentanediol, 2,5-hexanediol, and 3-methyl-1,5-pentanediol, or a low-molecular diol compound such as ethylene glycol, propylene glycol, 1,4-butanediol, and 1,3-butanediol may be used alone or in combination of two or more types.

While the polyether-based polyurethane resin is obtained by a conventionally known method from the raw material listed above, may be obtained by preparing a prepolymer with a terminal NCO in an organic solvent from the aforementioned polyether polyol having a molecular weight of 500 to 5,000 and containing a terminal OH group, and an isocyanate compound, and then polymerizing the obtained prepolymer using a chain extender.

The weight-average molecular weight of the polyether-based polyurethane resin is 10,000 to 200,000 or preferably 50,000 to 100,000 for aromatic polyether-based polyurethane, and 10,000 to 300,000 or preferably 50,000 to 200,000 for the aliphatic polyether-based polyurethane.

The polycarbonate-based polyurethane resin may be obtained from a diisocyanate compound that is the same as the diisocyanate compound used as the raw material of the polyester-based polyurethane resin and the following polymeric diol compound.

Examples of the polymeric diol compound include linear glycols such as 1,3-propanediol, 1,4-butanediol, and 1,6-hexanediol, branched glycols such as 1,2-propanediol, neopentyl glycol, 3-methyl-1,5-pentanediol, and 2-ethyl-2-butyl-1,3-propanediol, polyester diols obtained by polycondensation of a low-molecular-weight diol component such as ether-based diols such as diethylene glycol and triethylene glycol with a diacid component such as adipic acid and phthalic acid or by ring-opening reaction of a cyclic ester compound such as lactones, additionally, polyether diols obtained by homopolymerization or copolymerization of, for example, ethylene oxide, propylene oxide, or tetrahydrofuran, and furthermore, polycarbonate diols obtained by reacting a carbonate component such as alkylene carbonate, diallyl carbonate, and dialkyl carbonate or phosgene with the low-molecular-weight diol component.

Any of these polymeric diol compounds may be used alone or in combination of two or more types.

Furthermore, in addition to the polymeric diol compound, alkane diol such as 1,4-pentanediol, 2,5-hexanediol, and 3-methyl-1,5-pentanediol, or a low-molecular diol compound such as ethylene glycol, propylene glycol, 1,4-butanediol, and 1,3-butanediol may be used alone or in combination of two or more types.

While the polycarbonate-based polyurethane resin is obtained by a conventionally known method from the raw material listed above, it may be obtained by preparing a prepolymer with a terminal NCO in an organic solvent from the aforementioned polycarbonate polyol having a molecular weight of 500 to 5,000 and containing a terminal OH group, and an isocyanate compound, and then polymerizing the obtained prepolymer using a chain extender.

The weight-average molecular weight of the polycarbonate-based polyurethane resin is 10,000 to 200,000 or preferably 50,000 to 100,000 for aromatic polycarbonate-based polyurethane, and 10,000 to 300,000 or preferably 50,000 to 200,000 for the aliphatic polycarbonate-based polyurethane.

(Wax Emulsion)

The aqueous white ink composition for inkjet in the present invention may, but does not necessarily have to, contain a wax emulsion.

The wax emulsion has the effect of improving antiblocking property of a printed matter.

Such a wax emulsion preferably includes an emulsion of paraffin wax or polyethylene wax, and a paraffin wax emulsion is particularly preferred. A specific example of the paraffin wax emulsion includes AQUACER 539 (manufactured by BYK-Chemie GmbH). Also, a polyethylene wax emulsion, AQUACER 507, AQUACER 515, AQUACER 531 (all of which are manufactured by BYK-Chemie GmbH), HITECH the 6314 (solid content 35%, nonionic emulsified polyethylene wax emulsion, manufactured by TOHO Chemical Industry Co., Ltd.), HITECH E-1000 (solid content 35%, nonionic emulsified polyethylene wax emulsion, manufactured by TOHO Chemical Industry Co., Ltd.), etc. can be used. Any of these may be used alone or in combination of two or more types.

The average particle size of the wax in the wax emulsion is preferably 100 to 300 nm and more preferably 200 to 280 nm.

And, the solid content concentration in the case the wax emulsion is added in the aqueous white ink composition for inkjet according to the present invention is preferably 0.1 to 5.0% by mass and more preferably 0.4 to 3.0% by mass to improve the effects in a well-balanced manner. If it is less than 0.1% by mass, laminate strength to a drawn polypropylene film or a PET film may possibly be degraded, while if is exceeds 5.0% by mass, storage stability and discharge stability may possibly be degraded.

(Acrylic Resin Emulsion)

An acrylic-based resin in an emulsion or aqueous solution form, other than the acrylic-based resin used in the aforementioned pigment dispersant, regardless of whether it is derived from an aqueous resin varnish or not, can be blended into the aqueous white ink composition for inkjet in the present invention.

The acrylic-based resin is obtained by polymerizing, as a monomer, unsaturated carboxylic acid such as (meth)acrylic acid and maleic acid (anhydride), (meth)acrylic acid ester including an aliphatic hydrocarbon group such as methyl (meth)acrylate, ethyl (meth)acrylate, propyl (meth)acrylate, butyl (meth)acrylate, hexyl (meth)acrylate, 2-ethylhexyl (meth)acrylate, lauryl (meth)acrylate, myristyl (meth)acrylate, cetyl (meth)acrylate, stearyl (meth)acrylate, oleyl (meth)acrylate, and eicosyl (meth)acrylate, a (meth)acrylic acid ester compound including a hydroxy alkyl group such as 2-hydroxymethyl (meth)acrylate, 2-hydroxyethyl (meth) acrylate, (meth)acrylic acid-2-hydroxypropyl, and (meth) acrylic acid-3-hydroxypropyl, (meth)acrylamide, acrylonitrile, an olefin-based compound, or the like, a styrene-based monomer such as styrene, α-methyl styrene, vinyl toluene, dimethyl styrene, ethyl styrene, isopropyl styrene, t-butyl styrene, chlorostyrene, dichlorostyrene, bromostyrene, and fluorostyrene, a benzyl (meth)acrylate-based monomer such as benzyl (meth)acrylate, or a phenyl (meth)acrylate-based monomer such as phenyl (meth)acrylate. Any of these acrylic-based resins may be used alone or in combination of two or more types. In particular, a styrene-acrylic-based resin is preferably used.

The glass transition temperature (Tg) of the acrylic-based resin is preferably −30 to 120° C., the weight-average molecular weight is preferably 3000 to 50000, and the acid value is preferably 0 to 100 mgKOH/g.

Any of these acrylic-based resins may be used alone or in combination of two or more types to the extent that it does not hinder the effects achieved by the present invention.

When an acrylic-based resin is contained, the content relative to the total amount of the aqueous white ink composition for inkjet is preferably 1.0 to 10.0% by mass, or more preferably 1.0 to 8.0% by mass, or even more preferably 1.0 to 5.0% by mass.

If the total amount of acrylic-based resin used is less than 1.0% by mass, fixing property on the base material becomes insufficient, and a blur may occur. If the total amount used exceeds 10.0% by mass, on the other hand, the solids content increases excessively, which may possibly cause discharge stability to drop.

(Aqueous Medium)

The aqueous medium used for the aqueous white ink composition for inkjet in the present invention may be constituted by water and an aqueous organic solvent.

The water is preferably ion-exchange water from which, for example, metal ions are removed, or distilled water.

In some cases, containing the aqueous organic solvent imparts better suitability for inkjet printing in, for example, storage stability, discharge stability, and ink jetting property. Examples of such an aqueous organic solvent include monoalcohols, polyhydric alcohols, lower alkyl ethers of a polyhydric alcohol, ketones, ethers, esters, and nitrogen-containing compounds. Any of these may be used alone or in combination of two or more types.

Specific examples of monoalcohols include methanol, ethanol, n-propanol, n-butanol, n-pentanol, n-hexanol, n-heptanol, n-octanol, n-nonyl alcohol, n-decanol, or isomer thereof, cyclopentanol, cyclohexanol, etc, and are preferably alcohols having an alkyl group with 1 to 6 carbons.

Specific examples of polyhydric alcohols include ethylene glycol, propylene glycol, 1,3-butylene glycol, 1,4-butylene glycol, 1,2-pentanediol, 1,5-pentanediol, neopentyl glycol, 1,2-hexanediol, 1,6-hexanediol, 1,2-cyclohexanediol, heptanediol, 1,8-octanediol, 1,9-nonanediol, 1,10-decanediol, glycerin, pentaerythritol, diethylene glycol, dipropylene glycol, triethylene glycol, tetraethylene glycol, polyethylene glycol, polypropylene glycol, thiodiglycol, etc.

Specific examples of lower alkyl ethers of polyhydric alcohols include ethylene glycol monomethyl ether, ethylene glycol dimethyl ether, ethylene glycol monoethyl ether, ethylene glycol diethyl ether, ethylene glycol monopropyl ether, ethylene glycol isopropyl ether, ethylene glycol monobutyl ether, ethylene glycol isobutyl ether, propylene glycol monomethyl ether, propylene glycol monoethyl ether, propylene glycol monopropyl ether, propylene glycol monobutyl ether, diethylene glycol monomethyl ether, diethylene glycol monoethyl ether, dipropylene glycol mono-n-propyl ether, dipropylene glycol mono-n-butyl ether, etc.

Specific examples of ketones include acetone, methyl ethyl ketone, methyl butyl ketone, methyl isobutyl ketone, diisopropyl ketone, cyclopentanone, cyclohexanone, etc.

Specific examples of ethers include isopropyl ether, n-butyl ether, tetrahydrofuran, tetrahydropyran, 1,4-dioxane, etc.

Esters include, for example, propylene carbonate, methyl acetate, ethyl acetate, propyl acetate, isopropyl acetate, butyl acetate, isobutyl acetate, amyl acetate, ethyl lactate, ethyl butyrate, dibutyl phthalate, dioctyl phthalate, and a cyclic ester such as ε-caprolactone and ε-caprolactam.

Examples of nitrogen-containing compounds include urea, pyrrolidone, N-methyl-2-pyrrolidone, and octyl pyrrolidone.

The content of the aqueous organic solvent is not limited to a particular amount, but is preferably 15 to 50% by mass in the aqueous white ink composition for inkjet.
(Surfactant)

The surfactant used in the present invention is a compound including an acethylenediol skeleton. Examples of such a surfactant include SURFYNOL 104 series manufactured by Air Products and Chemicals, Inc. More specifically, examples include SURFYNOL 104E, SURFYNOL 104H, SURFYNOL 104A, SURFYNOL 104BC, SURFYNOL 104DPM, SURFYNOL 104PA, SURFYNOL 104PG-50, SURFYNOL 420, SURFYNOL 440, OLFINE E1004, OLFINE E1010, OLFINE E1020, OLFINE PD-001, OLFINE PD-002W, OLFINE PD-004, OLFINE PD-005, OLFINE EXP. 4001, OLFINE EXP. 4200, OLFINE EXP. 4123, and OLFINE EXP. 4300 manufactured by Nissin Chemical Industry Co., Ltd. Any of these may be used alone or in combination of two or more types.

The content of the surfactant in the aqueous white ink composition for inkjet is preferably 0.1 to 10% by mass and more preferably 0.1 to 5.0% by mass.
(Additives)

Furthermore, known additives such as a pigment dispersant, an antifungal agent, a rustproofing agent, a thickening agent, an antioxidant, an UV absorbent, a storability improving agent, a defoaming agent, and a pH adjusting agent may also be added to the aqueous white ink composition for inkjet in the present invention depending on the purpose.
(Method for Manufacturing Aqueous White Ink Composition for Inkjet)

Methods for manufacturing the aqueous white ink composition for inkjet in the present invention using the above constituents are:

(1) A method to prepare an aqueous white ink composition for inkjet (hereinafter, referred to as Manufacturing Method 1) by mixing, for example, titanium oxide, an aqueous resin varnish obtained by dissolving an alkali-soluble resin in water in the presence of a basic compound, and a pigment dispersant according to need, followed by dispersing the pigment using various dispersers, such as a ball mill, an attritor, a roll mill, a sand mill, or an agitator mill, and further adding the remaining materials.

(2) A method to prepare an aqueous white ink composition for inkjet (hereinafter, referred to as Manufacturing Method 2), after dispersing the pigment using the above-mentioned method, by obtaining a resin-coated pigment with an alkali-soluble resin precipitated on the pigment surface through, for example, an acid precipitation method or ion exchange means disclosed in Re-publication of PCT International Publication WO2005/116147, followed by neutralizing the obtained resin-coated pigment by a basic compound and redispersing it in water using various dispersers (high-speed agitator, etc.), and further adding the remaining materials.

The aqueous white ink composition for inkjet in the present invention obtained in this way has an initial viscosity in the range of 2.0 to 10.0 mPA·s or preferably 3.0 to 7.0 mPA·s after production.
(Applications)

The aqueous white ink composition for inkjet in the present invention may be used for known applications.

It should be noted, however, that the aqueous white ink composition for inkjet is preferably employed when it is intentionally not stirred for 1 week or more, furthermore 3 weeks or more, and moreover 5 weeks or more in a case such as when the aqueous white ink composition for inkjet that has been adjusted is stored or transported in a container such as a tank having a capacity of 1 L or more, more preferably 3 L or more, even more preferably 5 L or more, and most preferably 10 L or more, and not in a small tank having a capacity less than or equal to 30 mL.

Conventionally used metal or resin tanks may be used for storing or transporting the aqueous white ink composition for inkjet in the present invention.

The aqueous white ink composition for inkjet in the present invention is placed in such a tank, and the tank is stored by publicly known means such as in a freezer or transported in a state in which the tank is placed in a freezer.

In doing so, the storage or transporting temperature is set so that the temperature of the entire aqueous white ink composition for inkjet is preferably −5° C. or lower, more preferably −10° C. or lower, and even more preferably −13° C. or lower, and preferably −25° C. or higher and more preferably −35° C. or higher. A temperature exceeding −5° C. may fail to sufficiently exhibit the effects achieved by the present invention, and a temperature lower than −35° C. causes the ink to freeze, which fails to further improve the effects.

When the aqueous white ink composition for inkjet is placed in a cartridge used in an inkjet printer after storage or transport, the aqueous white ink composition for inkjet may first be returned to room temperature.

EXAMPLES

The present invention is explained in greater detail below using examples; however, the present invention is not limited to these examples. It should be noted that, unless otherwise specified, "%" means "% by mass," while "part" means "part by mass." It should be noted that "X" in Table 1 shows the result of the thawed aqueous white ink composition for inkjet that has previously been frozen.

The materials used in Examples and Comparative Examples below are listed below. All components other than solvents are expressed in solids content.

In the table, the unit of values in the rows of Pigments, Dispersants, Resins, Solvents, and Total is "% by mass."

Examples 1 to 18 and Comparative Examples 1 to 6

<Production of Aqueous White Ink Composition for Inkjet>

According to the formulations in Table 1 (formulation ratio of each material is based on % by mass), the respective materials were mixed under agitation to obtain the aqueous white ink compositions for inkjet in Examples 1 to 18 and Comparative Examples 1 to 6.

<Anti-Settling Property and Redispersibility of Ink Composition>

For the evaluation of the anti-settling property, 500 mL of the aqueous white ink composition for inkjet produced as described above was prepared and left to stand for 1 month in a columnar plastic container having a capacity of 1 L (8 cm in diameter×18.5 cm in height) under each temperature condition. The container was inverted after 1 month, and the amount of precipitate was visually evaluated. Also, in evaluating redispersibility, after inverting the container, the ink composition was stirred using a disperser under the condition of 400 rpm for 5 minutes, and whether the precipitate was redispersed was visually observed.

[Evaluation Criteria for Anti-Settling Property]
- ○: Precipitate was produced by an amount of 0 to 0.5 cm from the bottom.
- Δ: Precipitate was produced by an amount of 0.5 to 1 cm from the bottom.
- x: Precipitate was produced by an amount of 1 cm or more from the bottom.

[Evaluation Criteria for Redispersibility]
- ○: Redispersed
- Δ: Mostly redispersed, but a small amount of precipitate remained.
- x: No change in precipitate <Change in Physical Properties of Ink Composition>

Each of the aqueous white ink compositions for inkjet produced as described above was placed in a glass bottle, and the viscosity (mPa·s) at 25° C. was measured using a viscometer ("RE100L" manufactured by Toki Sangyo Co., Ltd.). Subsequently, the glass bottles were sealed and stored under each temperature condition for one month, and the viscosity (25° C.) after storage was measured using the viscometer. Evaluation of the change in the physical properties was made depending on the viscosity change rate.

[Evaluation Criteria for Change in Physical Property]
- ○: Having a viscosity change rate of less than 5%
- Δ: Having a viscosity change rate of 5% or more and less than 10%
- x: Having a viscosity change rate of 10% or more <Preparation of Aqueous Resin Varnish A>

In a pressure polymerizer equipped with a thermometer and an agitator, 200.0 parts of polyester diol having a number average molecular weight of 2000 obtained by dehydration copolymerization of 1,6-hexanediol and phthalic acid, 5.4 parts of dimethylolpropionic acid, 21.9 parts of hexamethylene diisocyanate, and 265.5 parts of methyl ethyl ketone were placed and allowed to react at 75° C. for 7 hours. Subsequently, 3.9 parts of triethylamine and 539.5 parts of pure water were added, and the methyl ethyl ketone was distilled under reduced pressure, which gave an aqueous resin varnish A having a weight-average molecular weight of 24,000 and containing a self-emulsifying polyurethane resin having a theoretical acid value of 9.9 mgKOH/g by 30% in the solid content.

<Preparation of Aqueous Resin Varnish B>

30 parts by mass of an acrylic acid/lauryl acrylate/styrene copolymer having a weight-average molecular weight of 23,000, an acid value of 185 mgKOH/g, and a glass transition temperature of 46° C. was dissolved in a mixed solution of 4.9 parts by mass of potassium hydroxide and 65.1 parts by mass of water to obtain an aqueous resin varnish B having a solid content of 30%.

<Preparation of Aqueous Resin Varnish C>

30 parts by mass of an acrylic acid/lauryl acrylate/styrene copolymer having a weight-average molecular weight of 23,000, an acid value of 185 mgKOH/g, and a glass transition temperature of 68° C. was dissolved in a mixed solution of 4.9 parts by mass of potassium hydroxide and 65.1 parts by mass of water to obtain an aqueous resin varnish C having a solid content of 30%.

<Preparation of Aqueous Resin Varnish D>

30 parts by mass of an acrylic acid/lauryl acrylate/styrene copolymer having a weight-average molecular weight of 23,000, an acid value of 185 mgKOH/g, and a glass transition temperature of 84° C. was dissolved in a mixed solution of 4.9 parts by mass of potassium hydroxide and 65.1 parts by mass of water to obtain an aqueous resin varnish D having a solid content of 30%.

<Preparation of Aqueous Resin Varnish E>

25 parts by mass of an acrylic acid/lauryl acrylate/styrene copolymer having a weight-average molecular weight of 23,000, an acid value of 140 mgKOH/g, and a glass transition temperature of 68° C. was dissolved in a mixed solution of 3.0 parts by mass of potassium hydroxide and 71.6 parts by mass of water to obtain an aqueous resin varnish E having a solid content of 25%.

<Preparation of Aqueous White Ink Bases>

Pigment-dispersing resin varnish was prepared by adding and mixing 20.0 parts by mass of water to 40.0 parts by mass of each aqueous resin varnish A to E. To each of these varnishes was further added 40 parts by mass of titanium oxide (product name: R-960 manufactured by DuPont), which was then agitated to be mixed, followed by milling using a wet circulation mill to prepare aqueous pigment white bases ink A to E (having a pigment concentration of 40% by mass).

<Preparation of White Ink Compositions for Inkjet>

Based on the aqueous white ink base, an aqueous white ink composition for inkjet was prepared so as to have the composition in Table 1 below.

<Urethane Resin Emulsion>

Polyester-based: NeoRez R-2170 (manufactured by DSM Coating Resins, LLC.)

Polyether-based: NeoRez R-650 (manufactured by DSM Coating Resins, LLC.)

Polycarbonate-based: NeoRez R-4000 (manufactured by DSM Coating Resins, LLC.)

<Acrylic Resin Emulsion>

Mowinyl 6730 (manufactured by Japan Coating Resin Corporation)

<Wax Emulsion>

AQUCER 531 (manufactured by BYK-Chemie GmbH)

<SURFYNOL 465>

Surfactant having a solid content of 100% and an HLB of 13 manufactured by Evonik

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Aqueous pigment white base ink | A | 25 | 25 | 25 | 25 | 25 | 25 | | | | |
| | B | | | | | | | 25 | | | |
| | C | | | | | | | | 25 | | |
| | D | | | | | | | | | 25 | |
| | E | | | | | | | | | | 25 |
| Propylene glycol | | 35 | 35 | 35 | 35 | 35 | 35 | 35 | 35 | 35 | 35 |
| Polyester-based urethane resin emulsion (solids content) | | 5 | 0 | 5 | 5 | 5 | 5 | 5 | 5 | 5 | 5 |
| SURFYNOL 465 | | 1 | 1 | 1 | 1 | 1 | 1 | 1 | 1 | 1 | 1 |
| Water | | 34 | 39 | 34 | 34 | 34 | 34 | 34 | 34 | 34 | 34 |
| Total | | 100 | 100 | 100 | 100 | 100 | 100 | 100 | 100 | 100 | 100 |
| Transport and storage temperature (° C.) | | −10 | −10 | −15 | −20 | −5 | −30 | −10 | −10 | −10 | −10 |
| Frozen/Not frozen | | Not frozen | Not frozen | Not frozen | Not frozen | Not frozen | Frozen | Not frozen | Not frozen | Not frozen | Not frozen |
| Anti-settling property | | ○ | ○ | ○ | ○ | Δ | ○·※ | ○ | ○ | ○ | ○ |
| Redispersibility | | ○ | ○ | ○ | ○ | ○ | ○·※ | ○ | ○ | ○ | ○ |
| Change in physical properties after transport or storage | | ○ | ○ | ○ | ○ | ○ | ○ | ○ | ○ | ○ | ○ |

| | | Examples | | | | Comparative Examples | | | | | |
|---|---|---|---|---|---|---|---|---|---|---|---|
| | | 11 | 12 | 13 | 14 | 1 | 2 | 3 | 4 | 5 | 6 |
| Aqueous pigment white base ink | A | | | | | 25 | 25 | | | | |
| | B | 25 | | | | | | 25 | | | |
| | C | | 25 | | | | | | 25 | | |
| | D | | | 25 | | | | | | 25 | |
| | E | | | | 25 | | | | | | 25 |
| Propylene glycol | | 35 | 35 | 35 | 35 | 35 | 35 | 35 | 35 | 35 | 35 |
| Polyester-based urethane resin emulsion (solids content) | | 5 | 5 | 5 | 5 | 5 | 5 | 5 | 5 | 5 | 5 |
| SURFYNOL 465 | | 1 | 1 | 1 | 1 | 1 | 1 | 1 | 1 | 1 | 1 |
| Water | | 34 | 34 | 34 | 34 | 34 | 34 | 34 | 34 | 34 | 34 |
| Total | | 100 | 100 | 100 | 100 | 100 | 100 | 100 | 100 | 100 | 100 |
| Transport and storage temperature (° C.) | | −20 | −20 | −20 | −20 | 0 | 25 | 0 | 0 | 0 | 0 |
| Frozen/Not frozen | | Not frozen | Not frozen | Not frozen | Not frozen | Not frozen | Not frozen | Not frozen | Not frozen | Not frozen | Not frozen |
| Anti-settling property | | ○ | ○ | ○ | ○ | X | X | X | X | X | X |
| Redispersibility | | ○ | ○ | ○ | ○ | Δ | X | Δ | Δ | Δ | Δ |
| Change in physical properties after transport or storage | | ○ | ○ | ○ | ○ | ○ | ○ | ○ | ○ | ○ | ○ |

| | | Examples | | | | | | | |
|---|---|---|---|---|---|---|---|---|---|
| | | 1 | 3 | 4 | 5 | 15 | 16 | 17 | 18 |
| Aqueous pigment white base ink A | | 25 | 25 | 25 | 25 | 25 | 25 | 25 | 25 |
| Propylene glycol | | 35 | 35 | 35 | 35 | 35 | 35 | 35 | 39 |
| Polyester-based urethane resin emulsion (solids content) | Polyester-based | 5 | 5 | 5 | 5 | 0 | 0 | 0 | 0 |
| | Polyether-based | 0 | 0 | 0 | 0 | 5 | 0 | 0 | 0 |
| | Polycarbonate-based | 0 | 0 | 0 | 0 | 0 | 5 | 0 | 0 |

TABLE 1-continued

| | | | | | | | | |
|---|---|---|---|---|---|---|---|---|
| Acrylic resin emulsion (solids content) | 0 | 0 | 0 | 0 | 0 | 0 | 5 | 0 |
| Wax emulsion (solids content) | 0 | 0 | 0 | 0 | 0 | 0 | 0 | 1 |
| SURFYNOL 465 | 1 | 1 | 1 | 1 | 1 | 1 | 1 | 1 |
| Water | 34 | 34 | 34 | 34 | 34 | 34 | 34 | 34 |
| Total | 100 | 100 | 100 | 100 | 100 | 100 | 100 | 100 |
| Transport and storage temperature (° C.) | −10 | −15 | −20 | −5 | −10 | −10 | −10 | −10 |
| Frozen/Not frozen | Not frozen | Not frozen | Not frozen | Not frozen | Not frozen | Not frozen | Not frozen | Not frozen |
| Anti-settling property | ○ | ○ | ○ | Δ | ○ | ○ | ○ | ○ |
| Redispersibility | ○ | ○ | ○ | ○ | ○ | ○ | ○ | ○ |
| Change in physical properties after transport or storage | ○ | ○ | ○ | ○ | ○ | ○ | ○ | ○ |

According to Examples 1 to 14 in line with the present invention, regardless of whether the ink had frozen during cooling, the ink had good anti-settling property and redispersibility, and showed little change in physical properties after transport or storage. This may be regarded as a combined effect of the fact that the high viscosity of the aqueous white ink composition for inkjet during cooling prevented the dispersed pigment from settling and kept the pigment-dispersing resin adhered to the pigment surface.

In contrast, according to Comparative Examples 1 to 6 stored at 0° C. and 25° C., anti-settling property and redispersibility deteriorated.

Furthermore, according to the results of Examples 15 to 18, the same effect was produced with a polyether-based urethane resin emulsion, a polycarbonate-based resin emulsion, an acrylic resin emulsion, and a wax emulsion instead of a polyester-based urethane resin emulsion.

What is claimed:

1. A storing method comprising:
   placing an aqueous white ink composition for inkjet containing titanium oxide and a pigment dispersant in a tank; and
   maintaining the entire aqueous white ink composition for inkjet in the tank to have a temperature of −5 to −35° C.,
   wherein the aqueous white ink composition for inkjet contains resin particles,
   wherein the resin particles are contained as at least one selected from a polyurethane resin emulsion, an acrylic-based resin emulsion, a paraffin wax emulsion, a polyethylene wax emulsion, and a polyester-based resin,
   wherein the pigment dispersant contains a copolymer of styrene, lauryl acrylate, and acrylic acid.

2. The storing method according to claim 1, wherein the titanium oxide comprises either titanium oxide that has been subjected to, for example, surface treatment with any of silica, silica and alumina, and a silane coupling agent, or titanium oxide that has not been subjected to a surface treatment.

3. The storing method according to claim 1, wherein the titanium oxide comprises either titanium oxide that has been subjected to, for example, surface treatment with any of silica, silica and alumina, and a silane coupling agent, or titanium oxide that has not been subjected to a surface treatment.

* * * * *